(12) United States Patent
Herring et al.

(10) Patent No.: US 7,177,287 B1
(45) Date of Patent: Feb. 13, 2007

(54) SYSTEM AND METHOD FOR CONCURRENT WIRELESS VOICE AND DATA COMMUNICATIONS

(75) Inventors: Christopher M. Herring, Longmont, CO (US); Dannie G. Feekes, Lafayette, CO (US)

(73) Assignee: Advanded Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/477,876

(22) Filed: Jan. 5, 2000

(51) Int. Cl.
*H04B 7/212* (2006.01)
*H04J 3/00* (2006.01)

(52) U.S. Cl. .................. 370/280; 370/337; 370/347; 370/442; 370/493

(58) Field of Classification Search ............. 370/329, 370/337, 347, 352, 493–495, 498, 528
See application file for complete search history.

(56) References Cited

U.S. PATENT DOCUMENTS

| | | | |
|---|---|---|---|
| 5,239,545 A | | 8/1993 | Buchholz |
| 5,307,348 A | | 4/1994 | Buchholz et al. |
| 5,495,482 A | | 2/1996 | White et al. |
| 5,537,434 A | * | 7/1996 | Persson et al. ............ 375/134 |
| 5,598,417 A | * | 1/1997 | Crisler et al. ............. 370/348 |
| 6,104,726 A | * | 8/2000 | Yip et al. ................. 370/468 |
| 6,181,920 B1 | * | 1/2001 | Dent et al. ................ 455/101 |
| 6,256,298 B1 | * | 7/2001 | Nakajo ..................... 370/328 |
| 6,275,506 B1 | | 8/2001 | Fazel et al. |
| 6,385,189 B1 | * | 5/2002 | Kurtz ....................... 370/344 |
| 6,393,007 B1 | | 5/2002 | Haartsen |
| 6,393,014 B1 | * | 5/2002 | Daly et al. ................ 370/352 |
| 6,414,945 B1 | * | 7/2002 | Chennakeshu et al. .... 370/317 |
| 6,430,174 B1 | * | 8/2002 | Jennings et al. .......... 370/352 |
| 6,434,183 B1 | | 8/2002 | Kockmann et al. |
| 6,490,262 B1 | * | 12/2002 | Hogger .................... 370/337 |
| 6,493,338 B1 | * | 12/2002 | Preston et al. ............ 370/352 |
| 2002/0034171 A1 | | 3/2002 | Smith et al. |

\* cited by examiner

*Primary Examiner*—Chau Nguyen
*Assistant Examiner*—Soon D. Hyun

(57) ABSTRACT

Unitary transceiving units employ a multiple carrier, time-division-multiple-access (TDMA), time-division-duplex (TDD) protocol to conduct concurrent wireless voice and data communications wherein a first transceiving base station unit tethered to a network interface wirelessly communicates to a second, mobile transceiving unit. The mobile transceiving unit wirelessly transmits and receives packetized voice and data information that is separated and routed to respective voice or data networks. The unitary mobile transceiving unit thus functions as a concurrent voice phone and data communications terminal/computer.

25 Claims, 6 Drawing Sheets

SYSTEM AND METHOD FOR CONCURRENT WIRELESS VOICE AND DATA COMMUNICATIONS

CROSS REFERENCE TO RELATED APPLICATIONS

This application is related to commonly assigned and co-pending U.S. patent application Ser. No. 09/478,144 issued as U.S. Pat. No. 6,958,987 entitled "DECT-Like System and Method of Transceiving Information Over The Industrial-Scientific-Medical Spectrum" filed Jan. 5, 2000 and herein incorporated by reference.

BACKGROUND OF THE INVENTION

1. Field of the Invention

The invention relates generally to wireless communications and more specifically to a system and method of concurrent wireless voice and data communications.

2. Description of Related Art

The following background information is provided to aid in the understanding of the application of the present invention and is not meant to be limiting to the specific examples set forth herein. Reference is made to FIG. 1 that depicts the prior art Digital Enhanced Cordless Telecommunications (DECT) standard protocol promulgated by the European Telecommunications Standards Institute (ESTI). The DECT standard defines a multiple carrier, time-division-multiple-access (TDMA), time-division-duplex (TDD) protocol with ten channels (carrier frequencies) between 1881.792 MHz and 1897.344 MHz spaced 1.728 MHz apart. Each of the ten channels supports a ten-millisecond frame comprised of twenty-four time slots. TDD is provided by allocating twelve of the twenty-four slots for base station to cordless handset communications and the other twelve slots for cordless handset to base station communications. Each time slot comprises 480 bits with a 32-bit preamble for synchronization, 388 bits for data and 60 bits for guard time. The 388 data bits are further divided into an A-field, a B-field and 4 parity bits for error detection. The A-field comprises an 8-bit header, 40 bits of control information and 16 cyclic redundancy check (CRC) bits while the B-field provides 320 bits of data.

For speech applications, analog signals are digitized and encoded using adaptive differential pulse code modulation (ADPCM). So-called "frequency hopping" is employed to avoid interference by periodically assigning a different one of the ten channel frequencies to each of the twenty-four time slots. A form of frequency shift keying known as Gaussian filtered, Minimum Shift Keying (GMSK) is used to modulate the transmitted signal to provide continuous phase transitions between two adjacent symbols.

By way of further background circa 1992, the Olivetti corporation released a DECT-based wireless local area network (LAN) data communication product known as "NET3". Thereafter, the Siemens corporation introduced a voice communication DECT-based product known as the "Gigaset 900". Subsequent to and on going, ETSI promulgated a range of Radio local loop Access Profiles (RAP) to designate DECT standard interoperability with products employing the so-called wireless local loop (WLL) a.k.a. radio local loop (RLL) such as ISDN and GSM networks. For example, DECT is being applied to cordless terminal mobility (CTM) in Italy wherein a cordless handset operates with both private and public DECT base stations.

By way of even further background, the IEEE promulgated in its 802.11 standard, inter alia, definitions for Frequency Hopping Spread Spectrum (FHSS) and Direct Sequence Spread Spectrum (DSSS) implementations of the physical layer of a WLAN. For FHSS in North America and most of Europe, IEEE 802.11 requires 79 channels in 1 MHz steps beginning at 2.402 GHz and ending at 2.480 GHz with a minimum frequency hop of 6 MHz. FIG. 9 depicts the IEEE 802.11 protocol for packetizing information in a FHSS WLAN. One-hundred-twenty-eight (128) bits (a 96 bit preamble and 32 bit header) are sent to assist in synchronizing after a carrier hops from one frequency to the next. Payload data then follows in sizes ranging from 1 to 4095 bytes. The IEEE 802.11 standard however is devoid of any voice communication support.

Heretofore there has not been a product that supports both voice and data communications over a wireless transmission protocol such that voice conversations and data communications take place concurrently with unitary transceiving units for supporting both types of communications.

From the foregoing it can be seen that there is a need for a system and method that supports concurrent voice and data communications over wireless radio access technology such as, but not limited to DECT, employing unitary transceiving units.

SUMMARY OF THE INVENTION

To overcome the limitations of the prior art described above, and to overcome other limitations that will become apparent upon reading and understanding the present specification, the present invention discloses a system and method wherein unitary transceiving units employ a multiple carrier, time-division-multiple-access (TDMA), time-division-duplex (TDD) protocol to conduct concurrent wireless voice and data communications. A first transceiving base station unit is tethered to a voice communications network such as, but not limited to, a Public switched telephone network (PSTN), and to a data communications network and wirelessly communicates to a second, mobile transceiving unit. The mobile transceiving unit wirelessly transmits and receives packetized combined voice and data information to and from the base station unit. The base station unit receives and separates voice and data information and routes the respective information to either the voice or data network. The data network may manifest itself as, but is not limited to, a V.90, ISDN, DSL, or cable modem connections to the PSTN or Ethernet or Gigabit-Ethernet networks. The mobile transceiving unit receives, separates and processes voice and data information and routes the voice information to either a speaker/audio outlet and/or to the processing unit for processing and storage (e.g. digital answering machine) and the data information to the processing unit for applications such as, but not limited to, web browsing.

A feature of the present invention is that an unitary transceiving unit supports combined voice and data communications.

Another feature of the present invention is that concurrent voice and data communications enhances collaborative computing efforts wherein plural, remote users can conduct real-time audio dialog while viewing the same computing screen.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of a concurrent wireless voice and data communications system and method in accordance with the principles of the present invention.

DESCRIPTION OF THE PREFERRED EMBODIMENT

Figure 1:
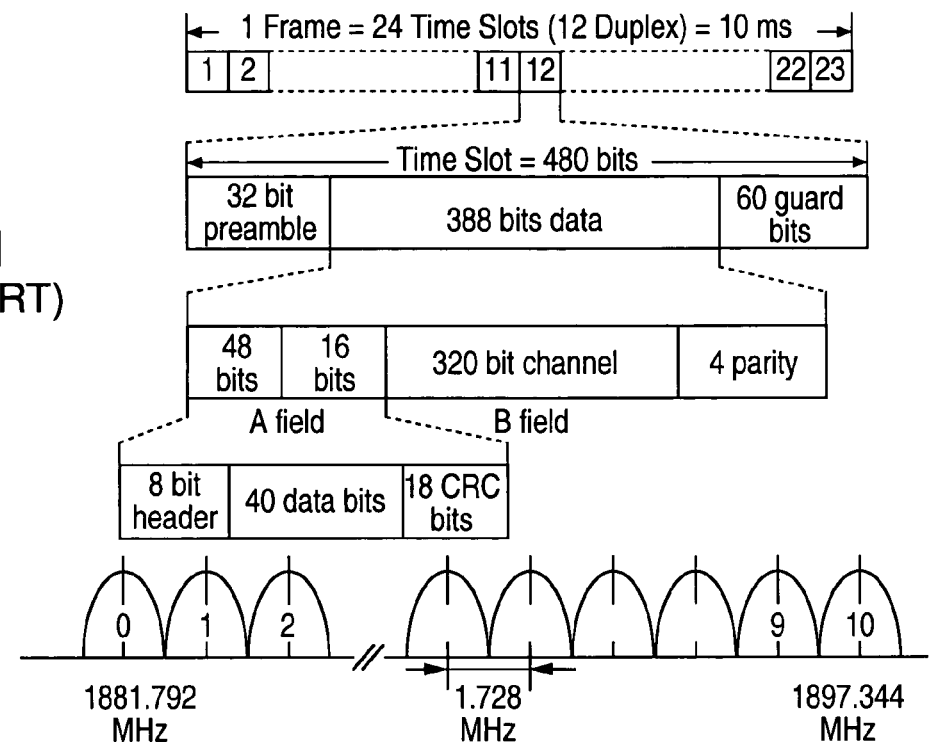
FIG. 1 depicts a prior art diagram of the Digital Enhanced Cordless Telecommunications (DECT) standard protocol promulgated by the European Telecommunications Standards Institute (ESTI)

The detailed description of the preferred embodiment for the present invention is organized as follows:

1.0 Exemplary System 2.0 Exemplary Personal Access Device (PAD)

3.0 Exemplary Base Station 4.0 Exemplary Transceiver Module 5.0 PAD to Base Station Synchronization 6.0 PAD-to-PAD Communications 7.0 Conclusion This organizational table and the corresponding headings used in this detailed description are provided for the convenience of reference only and are not intended to limit the scope of the present invention. It is to be understood that while the preferred embodiment is described herein below with respect to DECT and DECT-like wireless protocols, it has general applicability to any digital wireless communications technology. Certain terminology known to practitioners in the field of wireless communications is not discussed in detail in order not to obscure the disclosure. Moreover, in order not to obscure the disclosure with structural details which will be readily apparent to those skilled in the art having the benefit of the description herein, the structure, control and arrangement of conventional circuits have been illustrated in the drawings by readily understandable block representations showing and describing details that are pertinent to the present invention. Thus, the block diagram illustrations in the figures do not necessarily represent the physical arrangement of the exemplary system, but are primarily intended to illustrate the major structural components in a convenient functional grouping, wherein the present invention may be more readily understood.

Reference is now made to the accompanying drawings, which form a part hereof, and in which is shown by way of illustration specific embodiments in which the invention may be practiced. It is to be understood that other embodiments may be utilized and structural changes may be made without departing from the scope of the present invention.

1.0 Exemplary System

Figure 2:
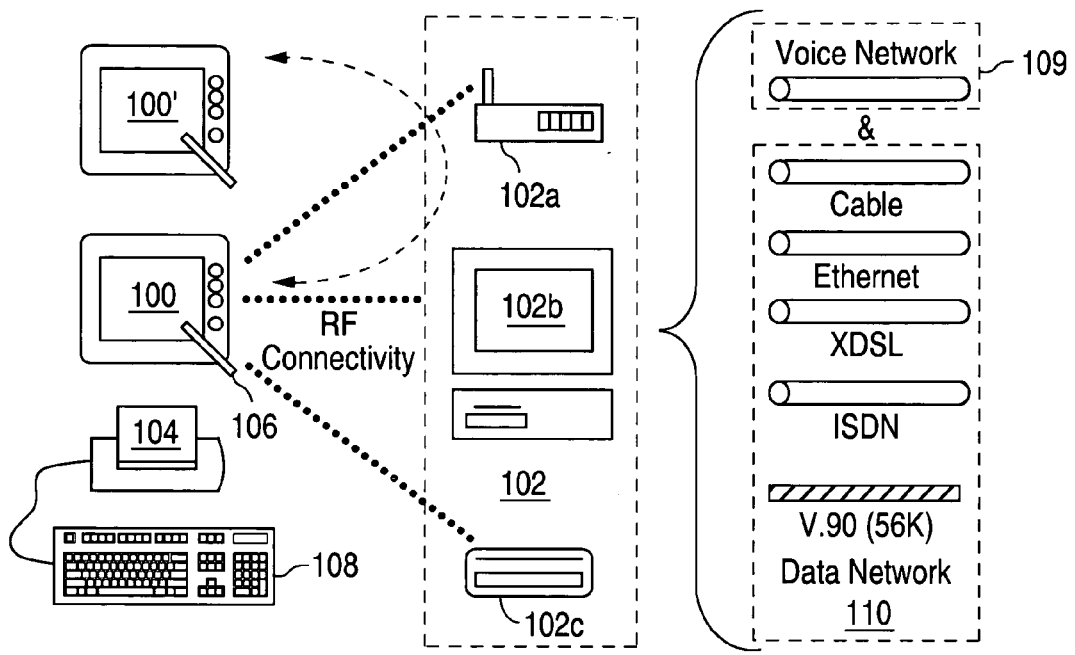
FIG. 2 depicts an illustrative but not limiting block diagram of a concurrent wireless voice and data communications system practiced in accordance with the principles of the present invention.

Reference is now made to FIG. 2 that depicts an illustrative but not limiting block diagram of a concurrent wireless voice and data communications system practiced in accordance with the principles of the present invention. A Personal Access Device (PAD) 100 and base station 102 employ the present invention to provide RF connectivity therebetween. The PAD 100 preferably resides in a charging cradle 104 to keep rechargeable batteries (not shown) refreshed when not in use. When the PAD 100 is stationary and docked on the charging cradle 104, commands may be entered with an optional keyboard 108 such as through the USB port 117. When the PAD 100 is mobile, commands may be entered on the touch screen/touch keyboard (described in more detail herein below) of the PAD 100 with a detachable stylus 106 that resides within a storage cavity formed in case of the PAD 100. The PAD 100 includes a microphone and speakers (described below) to support full duplex phone communications.

The base station 102 may manifest itself as an advanced set-top box 102a coupled to a television-like monitor (not shown), a stand-alone personal computer 102b or as a low cost stand alone device 102c with no display. The base station 102 is tethered to a voice network 109 that may manifest itself as but is not limited to a PSTN, and to a data network 110 that may manifest itself as but is not limited to, an Ethernet adapter, CATV, XDSL, ISDN or V.90 modems.

2.0 Exemplary Personal Access Device (PAD)

Figure 3:
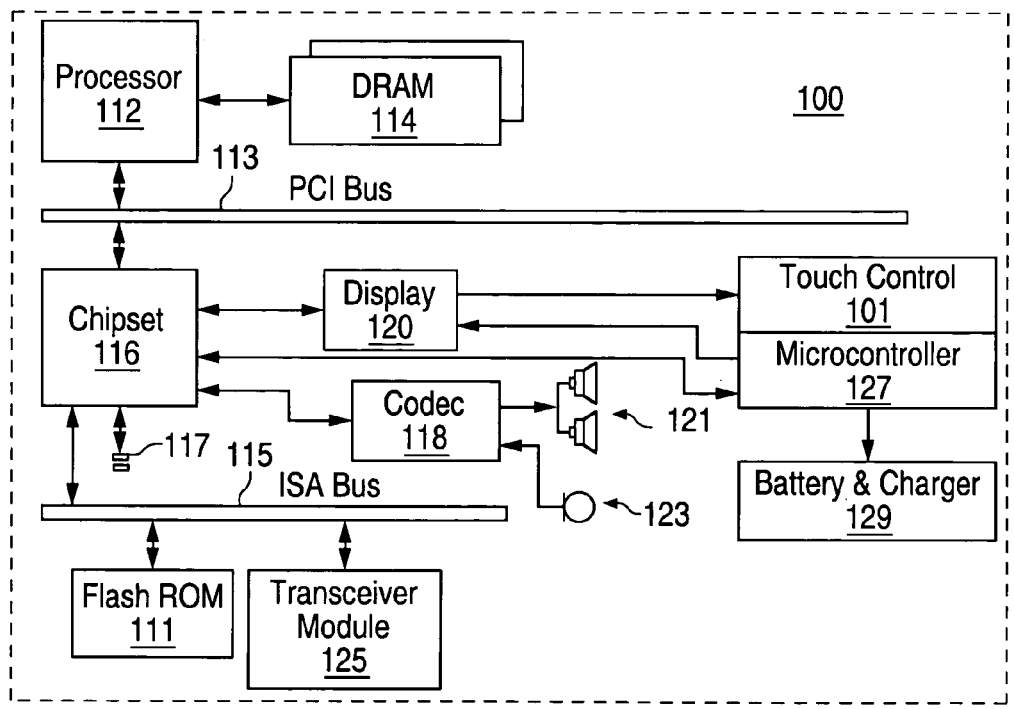
FIG. 3 depicts an illustrative but not limiting block diagram of a preferred Personal Access Device (PAD) practiced in accordance with the principles of the present invention.

Reference is now made to FIG. 3 that depicts an illustrative but not limiting block diagram of a preferred PAD 100 practiced in accordance with the principles of the present invention. A highly integrated processor 112 such as but not limited to, the Geode™ family of processors from National Semiconductor Corporation, Santa Clara, Calif., is coupled to DRAM 114 through an integrated DRAM controller (not shown) in the processor 112. A so-called "south bridge" chipset 116 is coupled to the processor 112, preferably through a PCI bus 113. The south bridge chipset 116 preferably includes an integrated ISA bus controller coupled to an ISA bus 115, a USB port 117 for supporting, inter alia, the keyboard 108 and FIFO buffers coupled to an audio CODEC 118. A flash ROM 111 is connected to the ISA bus 115 for storing code (such as an operating system and application programs) that is shadowed into DRAM 114 for execution by processor 112. The audio codec 118 converts digital signals to analog signals and drives speakers 121 and receives and converts analog signals from a monaural microphone 123 to digital signals for processing by processor 112. The display 120, which preferably is a DSTN or TFT LCD, is refreshed by a display adapter (not shown) that is integrated into either the processor 112 or chipset 116. The display 120 includes an overlaid programmable touch control panel 101 controlled by microcontroller 127 for use with removable stylus 106. The microcontroller 127 also provides charge profiling for rechargeable battery 129. The transceiver module 125 (discussed in more detail hereinbelow) is preferably, although not exclusively, connected to the ISA bus 115 for providing a wireless link to the base station 102.

3.0 Exemplary Base Station

Figure 4:
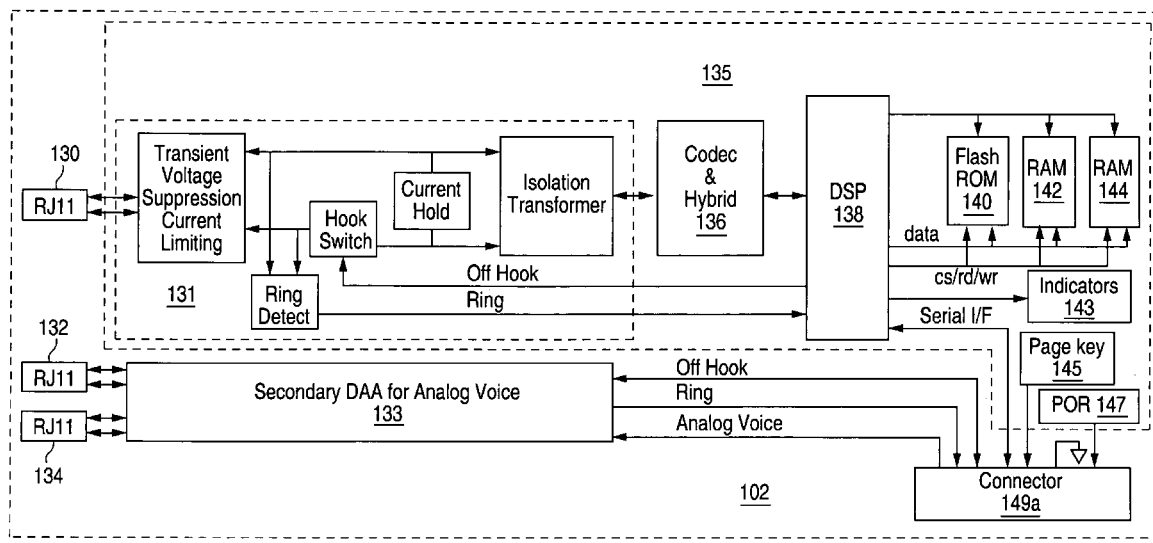
FIG. 4 depicts a first exemplary but not limiting block diagram of a first preferred base station practiced in accordance with the principles of the present invention.

Reference is now made to FIG. 4 that depicts a block diagram of the first preferred base station 102 without the transceiver module 125 installed, practiced in accordance with the principles of the present invention. While the first exemplary embodiment of the base station 102 is depicted as having a V.90 modem 135, those skilled in the art will readily recognize with the aid of the present disclosure, other forms of data network interfaces including but not limited to, ISDN, DSL and CATV modems and network adapters such as, but not limited to, Ethernet without departing from the scope of the present invention. The V.90 modem interface 135 of the base station 102 is coupled to a Public switched telephone network (PSTN) through RJ11 jack 130. RJ11 jack 130 connects a first analog phone line through a first Digital Access Arrangement (DAA) 131 included within the V.90 modem 135. A combined CODEC/hybrid circuit 136 separates transmitted signals from received signals from the PSTN and converts the received signals into digital form. The received digital signals are operated on by a digital signal processor (DSP) 138 that executes code out of flash ROM 140 and SRAM 142 and 144 to provide, inter alia, interface control, AT command processing, and processing functions needed to perform signal modulations. Through execution of the code, the DSP 138 provides a command line AT interpreter, error checking, re-transmission, compression and decompression functions as well as necessary signal modulation/demodulation, adaptive filtering and encoding/decoding required for a V.90 standard modem.

A second RJ11 jack 132 connects a second analog phone line from the PSTN to a second DAA 133 for voice reception/transmission. An optional third Rj11 jack 134 may be used to connect an external handset (not shown) to the base station 102. Optional LED indicators 143 controlled by DSP 138 display status of device ready, data and voice transmission in progress. Optional page key 145 may be provided to signal the transceiver module 150 (depicted in FIG. 5) through connector 149a to emit a page signal to the PAD 100. A power on reset (POR) circuit 147 provides reset signals to circuitry on the base station 102 as well as through connector 149a to the transceiver module 125, described in more detail herein below.

Figure 5:
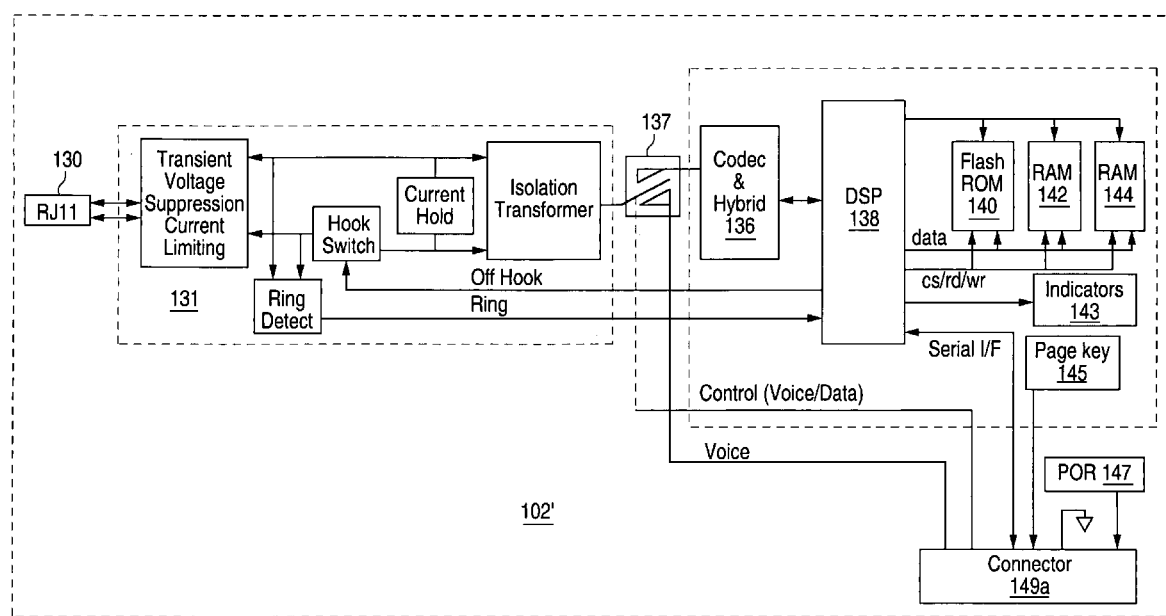
FIG. 5 depicts a second exemplary but not limiting block diagram of a second preferred base station practiced in accordance with the principles of the present invention.

Reference is now made to FIG. 5 that depicts a block diagram of a second preferred base station 102' without the transceiver module 125 installed, practiced in accordance with the principles of the present invention. The second preferred base station 102' is constructed similar to that of the first base station 102 except for the elimination of secondary DAA 133 and the addition of the relay 137. In the second preferred version of the base station 102', relay 137, which is controlled via the baseband processor 180 in transceiver module 125, switches the PSTN coupled through RJ11 jack 130 and DAA 131 to either the data network adapter (e.g. modem) or the ancillary analog voice channel (provided by the baseband processor 180 in transceiver module 125), all of which is discussed in more detail herein below.

Although while only one phone line is connected to the base station 102', the user of a PAD 100 can utilize the data network (via modem) and still be made aware of an incoming call via the transceiver module 125 that provides call notification and caller ID to allow the user of the PAD 100 to switch from the data network to the voice network. For example, this may manifest itself through a pop-up window on the PAD 100 notifying a single phone line user of PAD 100 (who may be surfing the world-wide-web) of an incoming phone call thus permitting the user of PAD 100 to switch from surfing the web to answer the phone call.

4.0 Exemplary Transceiver Module

Figure 6:
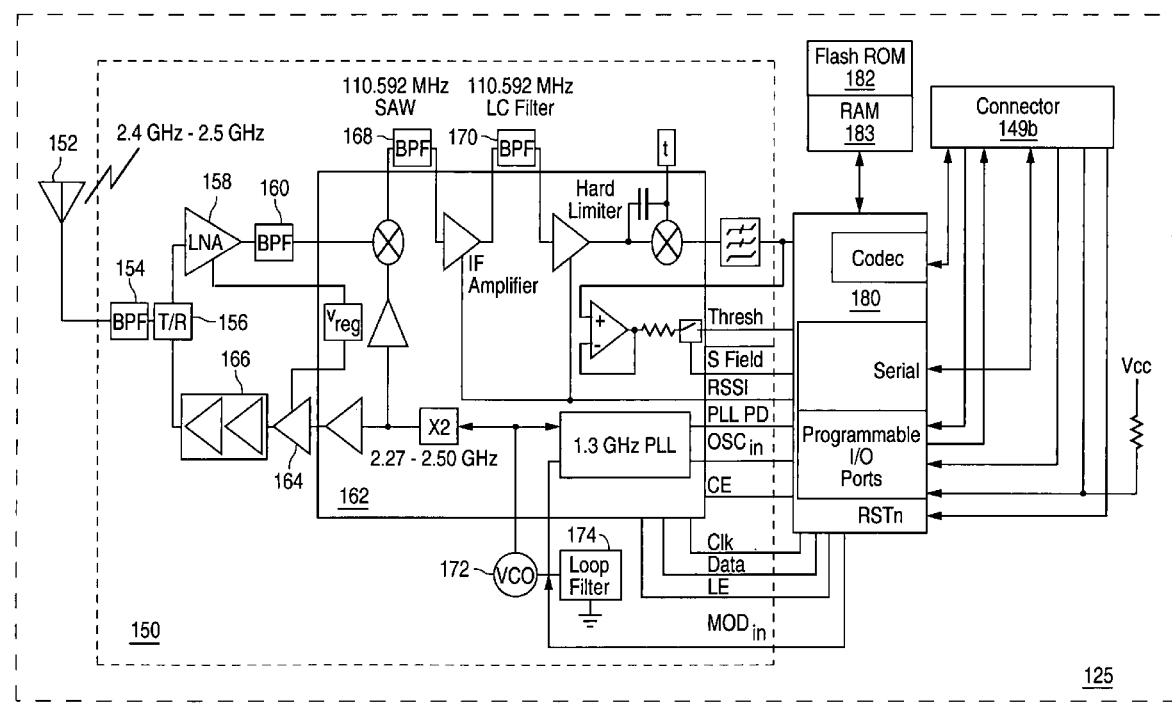
FIG. 6 depicts an exemplary but not limiting block diagram of a preferred transceiver module practiced in accordance with the principles of the present invention.

Reference is now made to FIG. 6 that depicts by way of illustration an exemplary but not limiting block diagram of the preferred transceiver module 125 practiced in accordance with the principles of the present invention. The transceiver module 125 comprises an antenna 152 (multiple antennas for diversity), an RF sub-module 150 coupled to a baseband processor 180, a flash ROM 182 and RAM 183 to store code for execution by the baseband processor 180 and a mating connector 149b for connecting to either the base station connector 149a or to the ISA bus 115 in the PAD 100.

The RF sub-module 150 includes, inter alia, a band pass filter (BPF) 154 coupled to a transmit/receive switch 156. Received data from the transmit/receive switch 156 is conditioned by a low noise amplifier (LNA) 158 and a BPF 160 prior to being sent to a mixer within single chip radio transceiver 162. Transmitted data from the single chip radio transceiver 162 is passed through a LNA 164 and transmit power amplifier 166 prior to being sent to transmit/receive switch 156. An exemplary but not limiting example of a single chip containing the BPFs 154 and 160, LNAs 158 and 164, transmit/receive switch 156 and power amplifier 166 is the AU2404T RF front-end integrated circuit from Alation Systems Inc. of Mountain View, Calif. Those skilled in the art, with the aid of the present disclosure, will recognize other forms and solutions for elements 154, 156, 158, 160, 164 and 166 without departing from the spirit and scope of the present invention.

The single chip radio transceiver 162 in combination with BPFs 168 and 170 and voltage controlled oscillator (VCO) 172 and loop filter 174 down convert (receive) or up convert (transmit) data to/from baseband processor 180. The preferred although not exclusive embodiment for the single chip radio transceiver 162 is the LMX3162 transceiver from National Semiconductor Corporation of Santa Clara, Calif., described in the *National Analog and Interface Products Databook* (and accompanying CD-ROM), 1999, which is herein incorporated by reference. The RF sub-module 150 is available from ALPS Electric Co, Ltd. of Tokyo, Japan under the model numbers UGSA4-402A (without antenna diversity) and UGSA4-502A (with antenna diversity) for 2.4 GHz operation and under the model numbers UGSE2-402A (without antenna diversity) and UGSE2-502A (with antenna diversity) for 1.8 GHz (DECT) operation.

The baseband processor 180 preferably comprises a CODEC and at least one sub-processor that executes code stored in flash ROM 182 and RAM 183 to handle, inter alia, audio, signal and data processing for tone generation, echo canceling and to program slot and frame timing for the RF sub-module 150. In general, the code executed by the baseband processor 180 in the transceiver module 125 is preferably layered in adherence with the Open Systems Interconnection (OSI) model, the details of which are known to one skilled in the art. The preferred although not exclusive embodiment for the baseband processor 180 is the SC14424 baseband processor from National Semiconductor Corporation of Santa Clara, Calif., described in detail in Appendix A hereto.

Figure 7:
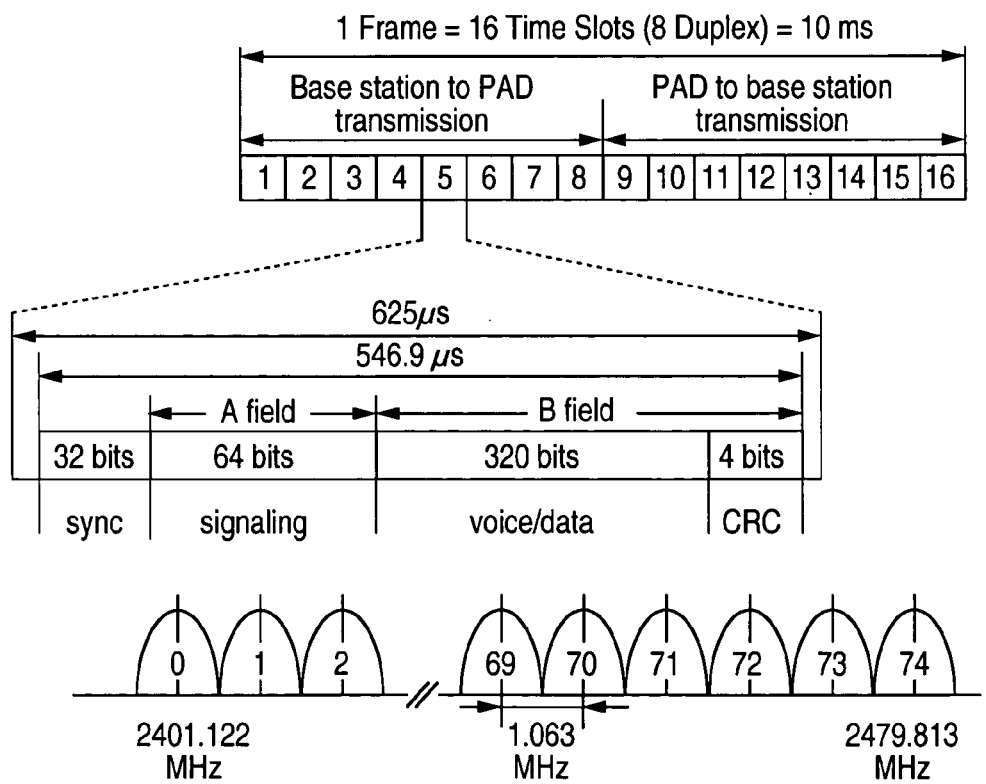
FIG. 7 depicts the preferred protocol for a concurrent wireless voice and data communications system practiced in accordance with the principles of the present invention.

Reference is now made to FIG. 7 that depicts the preferred protocol for a concurrent wireless voice and data communications system practiced in accordance with the principles of the present invention. The preferred protocol is a multiple carrier, Time-division-multiple-access (TDMA), Time-division-duplex (TDD) system. The preferred programmable, although not exclusive number of carrier frequencies is seventy-five ranging between 2401.122 MHz to 2479.813 MHz and spaced 1.063 MHz apart. Those skilled in the art having the benefit of the description herein will appreciate other numbers of carrier frequencies (e.g. ten), frequency spectrums (e.g. 1881.792 MHz to 1897.344 MHz) and spacings (e.g. 1.728 MHz apart) without departing from the scope the present invention. Each of the seventy-five channels supports a ten-millisecond frame preferably comprised of sixteen time slots. Those skilled in the art having the benefit of the description herein will appreciate other numbers of time slots without departing from the scope the present invention. Symmetrical TDD is provided by allocating half (i.e. eight of the sixteen slots) for base station to PAD communications and the other half (i.e. eight slots) for PAD to base station communications. Asymmetrical TDD is contemplated as well wherein base station to PAD communications consume more slots (e.g. twelve slots) than PAD to base station communications (i.e. four slots) or vice versa. Those skilled in the art having the benefit of the description herein will appreciate other asymmetric numbers of slot allocations for base station to PAD communications and vice versa without departing from the scope the present invention.

Each time slot preferably comprises a 32-bit preamble for synchronization, a 64 bit A-field for signaling and a B-field comprising 320 bits and 4 bits for CRC. Each of the sixteen time slots receives/transmits on one of the seventy-five carrier channels that preferably changes in a pseudo-random fashion, to one of the other seventy-four carrier channels after two consecutive frames thus providing fifty (50) hops/second. Those skilled in the art having the benefit of the description herein will appreciate other number of frequency carriers, hopping patterns and frequency hop periods without departing from the scope the present invention.

Figure 8:
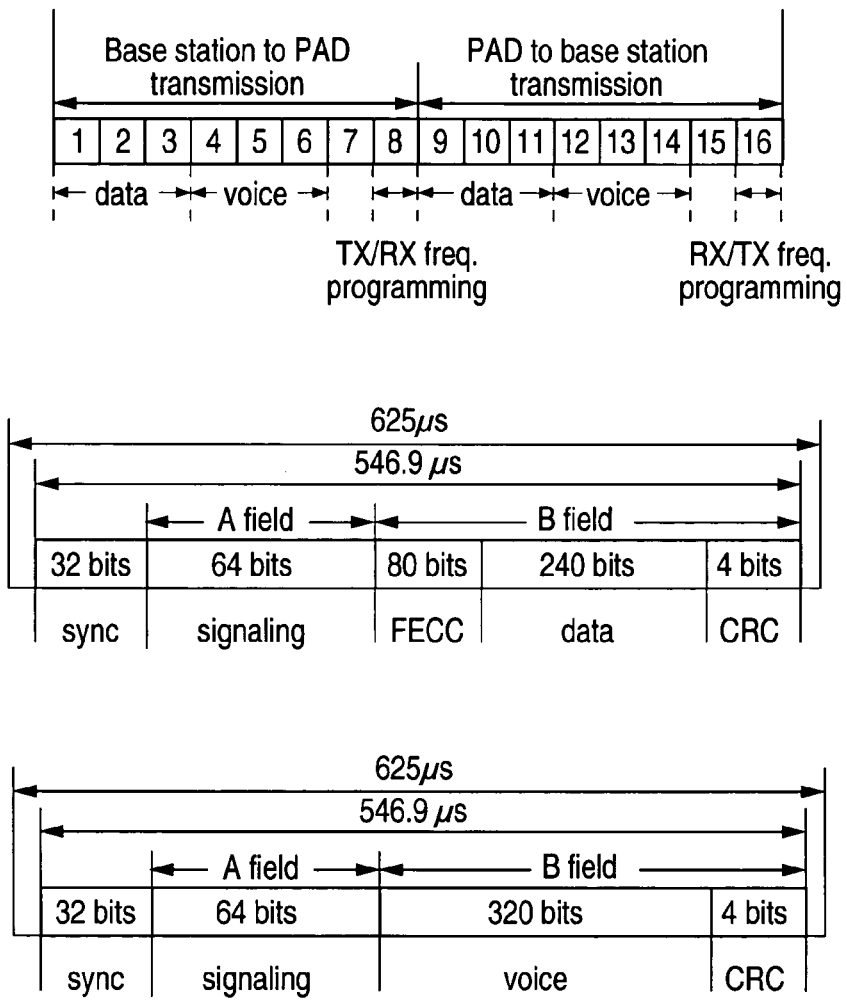
FIG. 8 depicts the preferred TDMA protocol for a concurrent wireless voice and data communications system practiced in accordance with the principles of the present invention, and, FIG. 9 depicts a prior art IEEE 802.11 protocol for packetizing information in a frequency hopping spread spectrum wireless local area network.
Figure 9:
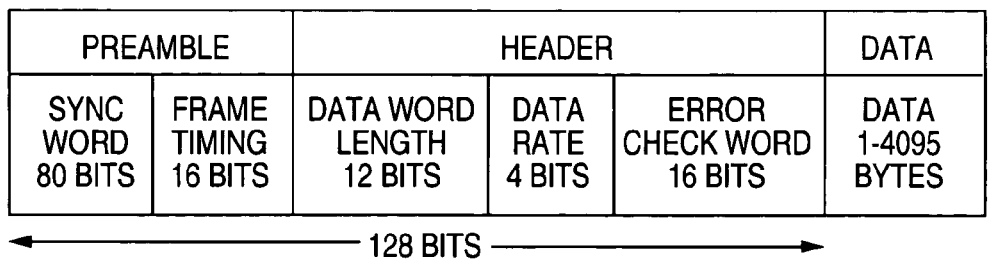

Reference is now made to FIG. 8 that depicts the preferred TDMA protocol in more detail. In the preferred embodiment, symmetric TDMA (with respect to both voice/data and base station/PAD communications) is provided by allocating time slots 1, 2, 3 and 9, 10, 11 for data communication between base station and PAD and PAD and base station, respectively, and time slots 4, 5, 6 and 12, 13, 14 for voice communication between base station and PAD and PAD and base station, respectively. Time slots 7 and 15 are reserved, time slot 8 is allocated to program the transmit carrier frequency in the single chip radio transceiver 162 and slot 16 is allocated to program the receive carrier frequency.

Asymmetrical TDMA is contemplated as well wherein data communications consume more slots (e.g. twelve slots) than voice communications (i.e. four slots) or vice versa. As mentioned above, asymmetry with respect to base station/PAD communications is contemplated and it is further contemplated that asymmetric base station/PAD communications may be used in combination with asymmetric data/voice TDMA. Those skilled in the art having the benefit of the description herein will appreciate other asymmetric numbers of slot allocations for base station/PAD communications and/or data/voice communications without departing from the scope the present invention.

To achieve frequency hopping, the transmit and receive carrier frequencies are changed by the baseband processor 180 reprogramming a phase locked loop (PLL) in the single chip radio transceiver 162. The transmit and receive carrier frequencies are changed by the baseband processor 180 in a pseudo-random fashion, to one of the other seventy-four carrier channels after two consecutive frames thus providing fifty (50) hops/second.

Referring to FIG. 8b, a time slot dedicated to data allocates 80 bits in the B field to a Forward Error Correction Code (FECC). The remaining 240 bits are payload data for processing by the PAD 100. A time slot dedicated to voice allocates the entire 320 bits in the B field to voice information since voice is tolerant to dropouts in bit patterns.

So-called "multi-slot" operation (e.g. double slot) is further contemplated wherein adjacent slots share a single set of sync, signaling, CRC bits and optionally, FECC bits. In a single data slot, the sync, signaling, CRC and FECC bits consume 180 out of the 420 bits allocated to a slot. By way of illustration and not of limitation, a double data slot shares one 32-bit preamble for synchronization, one 64 bit A-field for signaling, one set of 80 FECC bits and one set of four CRC bits, thus providing 660 payload data bits over two slots instead of the standard 480 bits—a 37.5% increase in bandwidth. Those skilled in the art having the benefit of the description herein will appreciate other multi-slot configurations (e.g. quad slots) and allocation of overhead bits without departing from the scope the present invention.

5.0 PAD to Base Station Synchronization

On power up, the baseband processor 180 in the transceiver module 125 of the PAD 100 executes code to set the received carrier frequency to a reference channel and to scan for incoming data during a time period of two frames (e.g. 20 milliseconds). If an A-Field with a correct CRC is detected, the baseband processor 180 continues to sample and decode A-Fields every frame (e.g. 10 milliseconds) for the expected ID of the base station 102. If a timeout occurs, the baseband processor 180 code restarts with the next carrier frequency channel. If the correct ID for the base station 102 is received, the A-field decoding continues until the current slot number, frame number, multi-frame number, and carrier channel in which the base station 102 is scanning are received. The base band processor 180 updates its corresponding internal variables and enters into a locked state when this information is received.

The baseband processor 180 in the transceiver module 125 of the base station 102 executes code to fix the transmit carrier frequency to a reference channel until the PAD 100 synchronizes. Thereafter, the baseband processor 180 executes code to change the transmit carrier frequency in the transceiver module 125 of the base station 102 every two frames (e.g. 20 milliseconds) in a pseudo-random sequence so long as correct A-Fields are found in two consecutive frames. The PAD 100 continues to receive A-Fields until the expected ID of the base station 102 is received or a timeout occurs. If a timeout occurs, the process is restarted with the reference channel frequency.

6.0 PAD-to-PAD Communications

PAD-to-PAD communications is further contemplated wherein multiple PADs communicate with one another through a common base station 102. By way of illustration and not of limitation, a second PAD 100' is added to FIG. 2 wherein PADs 100 and 100' communicate with one another via the base station 102. Each PAD 100 and base station have a unique ID associated with it that can be embedded in the A-field (64 bits of signaling) of the intended target. The baseband processor 180 in the transceiving module 125 of the base station 102 detects whether the received ID in the A-field is intended for the base station 102. If so, the voice/data information associated with that A-field is processed and routed to the respective voice/data network tethered to the base station 102. If not, the base station 102 relays the voice/data information associated with that A-field onto the intended PAD 100'.

7.0 Conclusion

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A system for concurrent wireless voice and data communications comprising:
   (a) a first transceiving unit coupled to a voice network and to a data network;
   (b) a second, mobile transceiving unit;
   (c) the first transceiving unit operable to wirelessly transmit to the second, mobile transceiving unit voice information from the voice network over a first dedicated set of time slots of each of a plurality of time frames and data information from the data network over a second dedicated set of time slots of each of the plurality of time frames; and,
   (d) the second, mobile transceiving unit to receive and separate the voice information and the data information from the first transceiving unit;
   wherein the first transceiving unit is further operable to implement a channel comprising the plurality of time frames, wherein a carrier frequency of the channel changes in a pseudo random manner; and
   wherein each time slot of the first and second dedicated sets of time slots has a fixed time slot position for each of the plurality of time frames.

2. The system as recited in claim 1 wherein the data network is a V.90 modem coupled to a public switched telephone network.

3. The system as recited in claim 1 wherein the data network is an ISDN modem coupled to a public switched telephone network.

4. The system as recited in claim 1 wherein the data network is a DSL modem coupled to a public switched telephone network.

5. The system as recited in claim 1 wherein the data network is a cable modem coupled to a CATV system.

6. The system as recited in claim 1 wherein the data network is an Ethernet network.

7. The system as recited in claim 1 wherein a time slot containing data information further comprises a forward error correction code.

8. The system as recited in claim 1 wherein
   the first transceiving unit is further operable to wirelessly receive from the second, mobile transceiving unit voice information over a third dedicated set of time slots of each of a plurality of time frames and data information over a fourth dedicated set of time slots of each of the plurality of time frames; and
   wherein each time slot of the third and forth dedicated sets of time slots has a fixed time slot position for the plurality each of each of time frames.

9. The system of claim 8, wherein a number of time slots of the first dedicated set of time slots is equal to a number of time slots of the third dedicated set of time slots.

10. The system of claim 9, wherein the number of time slots of the second dedicated set of time slots is equal to a number of time slots of the fourth dedicated set of time slots.

11. The system of claim 10, wherein the number of time slots of the first dedicated set of time slots is equal to the number time slots of the second dedicated set of time slots.

12. The method as recited in claim 11 wherein a time slot containing data information further comprises a forward error correction code.

13. The system of claim 8, wherein a number of time slots of the first dedicated set of time slots is different than a number of time slots of the third dedicated set of time slots.

14. The system of claim 13, wherein the number of time slots of the second dedicated set of time slots is different than a number of time slots of the fourth dedicated set of time slots.

15. A method comprising:
   transmitting voice information from a first transceiving unit to a second transceiving unit over a first dedicated set of time slots associated with each of a first plurality of time frames of a wireless channel;
   transmitting data information from the first transceiving unit to the second transceiving unit over a second dedicated set of time slots associated with each of the first plurality of time frames of a wireless channel; and
   changing a transmit frequency of the wireless channel in a pseudo random manner;
   wherein each time slot of the first and second dedicated sets of time slots has a fixed time slot position for each of the plurality of time frames.

16. The method of claim 15 further comprising:
   receiving voice information at the first transceiving unit from the second transceiving unit over a third dedicated set of time slots associated with each of a first plurality of time frames of a wireless channel;
   receiving voice information at the first transceiving unit from the second transceiving unit over a fourth dedicated set of time slots associated with each of the first plurality of time frames of a wireless channel; and
   wherein each time slot of the third and fourth dedicated sets of time slots has a fixed time slot position for each of the plurality of time frames.

17. The method of claim 16, wherein a number of time slots associated with the first dedicated set of time slots is equal to a number of time slots associated with the third dedicated set of time slots.

18. The method of claim 17, wherein a number of time slots associated with the second dedicated set of time slots is equal to a number of time slots associated with the fourth dedicated set of time slots.

19. The method of claim 18 wherein the number of time slots associated with the first dedicated set of time slots is equal to the number of time slots associated with the second dedicated set of time slots.

20. The method of claim 15, wherein changing the transmit frequency further comprises changing the transmit frequency of the wireless channel in a pseudo random manner after a predetermined number of time frames.

21. A system for concurrent wireless voice and data communications comprising a first transceiving unit coupled to a voice network and to a data network unit, the first transceiving unit operable to wirelessly transmit to a second transceiving unit voice information from the voice network over a first dedicated set of time slots of each of a plurality of time frames and data information from the data network over a second dedicated set of time slots of each of the plurality of time frames, the first transceiving unit being further operable to implement a channel comprising the plurality of time frames, wherein a frequency of the channel at which the plurality of time frames is transmitted changes in a pseudo random manner and wherein each time slot of the first and second dedicated sets of time slots has a fixed time slot position for each of the plurality of time frames.

22. The system of claim 21 wherein the second transceiving unit is a mobile unit.

23. The system of claim 21 wherein the frequency changes in a pseudo random manner between approximately 2401 MHz and 2480 MHz.

24. The system of claim 23, wherein the plurality of time frames can be transmitted at one of 75 frequencies.

25. A system for concurrent wireless voice and data communications comprising a first transceiving unit operable to wirelessly receive from a second transceiving unit voice information from a voice network over a first dedicated set of time slots of a plurality of each of time frames and data information from a data network over a second dedicated set of time slots of the plurality of each of time frames, the first transceiving unit further operable to implement a channel comprising the plurality of time frames, wherein a frequency of the channel at which the plurality of time frames is transmitted changes in a pseudo random manner and wherein each time slot of the first and second dedicated sets of time slots has a fixed time slot position for the plurality of each of time frames.

* * * * *

UNITED STATES PATENT AND TRADEMARK OFFICE
CERTIFICATE OF CORRECTION

PATENT NO. : 7,177,287 B1
APPLICATION NO. : 09/477876
DATED : February 13, 2007
INVENTOR(S) : Christopher M. Herring et al.

It is certified that error appears in the above-identified patent and that said Letters Patent is hereby corrected as shown below:

Column No. 10, Line No. 2-3, Change "for the plurality" to --for each of the plurality--

Column No. 10, Line No. 3, Change "plurality each of each of" to --plurality of--

Signed and Sealed this

Twenty-fourth Day of July, 2007

JON W. DUDAS
*Director of the United States Patent and Trademark Office*